United States Patent [19]

Coulmance et al.

[11] 4,042,875
[45] Aug. 16, 1977

[54] TEMPERATURE TRANSDUCER ARRANGEMENT WHICH SUPPLIES THRESHOLD VOLTAGES WITH THE AID OF A SINGLE SENSOR

[75] Inventors: Jean-Pierre Rene Coulmance, Osny; Jean-Claude Gerard Six, Sevres, both of France

[73] Assignee: U.S. Philips Corporation, New York, N.Y.

[21] Appl. No.: 624,725

[22] Filed: Oct. 22, 1975

[30] Foreign Application Priority Data

Oct. 25, 1974  France .................. 74.35841

[51] Int. Cl.² ............... F24D 13/02; G01K 7/20
[52] U.S. Cl. .................. 323/75 N; 307/39; 318/681; 323/19; 323/40
[58] Field of Search .................. 307/38, 39, 310; 318/678, 681; 323/16, 19, 24, 40, 68, 75 H, 75 N

[56] References Cited

U.S. PATENT DOCUMENTS

| | | | |
|---|---|---|---|
| 3,305,734 | 2/1967 | Buttenhoff | 323/19 UX |
| 3,429,178 | 2/1969 | Durbin | 323/75 N |
| 3,582,750 | 6/1971 | Halfhill | 318/681 X |
| 3,639,824 | 2/1972 | Malavasi | 323/19 X |
| 3,686,557 | 8/1972 | Futamura | 323/19 X |
| 3,768,545 | 10/1973 | Wills | 307/39 X |

*Primary Examiner*—A. D. Pellinen
*Attorney, Agent, or Firm*—Frank R. Trifari; Bernard Franzblau

[57] ABSTRACT

A temperature transducer includes first and second resistor bridges connected across a voltage source and first and second differential amplifiers. A first input terminal of the amplifiers are connected together to a common junction of the first resistor bridge. The second input terminals are connected to the second resistor bridge, one directly and the other via a voltage divider so that the input voltages of the differential amplifiers are mutually shifted to obtain two different operating voltage thresholds.

11 Claims, 4 Drawing Figures

TEMPERATURE TRANSDUCER ARRANGEMENT WHICH SUPPLIES THRESHOLD VOLTAGES WITH THE AID OF A SINGLE SENSOR

The present invention relates to a temperature transducer arrangement which supplies threshold voltages with the aid of a single sensor. This arrangement, inter alia, comprises a resistor bridge with one resistor having a high temperature coefficient, a voltage source, and at least two high gain differential amplifiers which are each destined for on/off control of a mains-powered electrical load.

The invention is in particular, though not exclusively, employed in control devices for electric heaters of the accumulator type.

It is known that such a method of heating consists in energizing a resistor embedded in a block of fire-bricks during night hours when the tariffs are particularly low, the heat thus being accumulated being extracted from the block during the day.

If the installation is proportioned so that heat accumulation is effected exclusively at the lowest outdoor temperatures against night tariff, the weight and bulk of the equipment as well as the installation costs will be prohibitive.

It has been calculated that it is much more economical to have a smaller installation which demands additional power outside the night-tariff period during the few winter days when the outside temperature drops to extremely low values. For an effective temperature control of such an installation, the threshold temperatures must be very near to each other, for example with a difference of 1° C, which makes it necessary to have a single sensor so as to ensure a high-accuracy with respect to the mutual deviations of the threshold temperatures in the event of a variation of the absolute value.

Generally, control is effected by controlling on the one hand the power supply of the accumulation resistor and on the other hand the power supply of either a hot-air extractor fan or an additional resistor. It is therefore necessary to control two operations from threshold temperatures which are very near to each other but different.

These operations are controlled with the aid of two high-gain differential amplifiers which operate as on/off switches, which eliminates any possibility of accidental drift in the circuits connected to the output of said amplifiers. The amplifiers may be incorporated in monolithic integrated temperature-control circuits, for example those which are commercially available from N.V. Philips Gloeilampenfabrieken under the designation "TCA 280 A".

It is an object of the invention to provide precision temperature controllers which operate with the aid of two circuits which independently infuence two electrical loads with the aid of a single temperature sensor.

Another object of the invention is to allow the "night" or "day" threshold temperatures to be changed in a simple manner on the basis of information supplied by the "night"/"day" switching device of the supply mains.

According to the invention, the temperature transducer arrangement which supplies threshold voltages with the aid of a single sensor, which arrangement inter alia comprises a resistor bridge with one resistor having a high temperature-coefficient, a voltage source and at least two high-gain differential amplifiers which are each destined for on/off control of a mains-powered electrical load, is characterized in that two interconnected first inputs of the differential amplifiers are connected to the common point of the resistor bridge, which bridge is connected to the terminals of the voltage source, whereas the second inputs are connected to a further resistor bridge, one directly and the other via a voltage divider, which bridge is also included between the terminals of the voltage source.

Preferably, the second inputs of the differential amplifiers are also connected to a second voltage source which in controlled by the action of a switch which is incorporated in the "day"/"night" tariff device of the mains supply.

By using more than two differential amplifiers, several operating thresholds are obtained which correspond to different threshold voltages so that, for example, a complex industrial process may be programmed.

The invention will be described in more detail with reference to the accompanying drawings in which.

Figure 1:
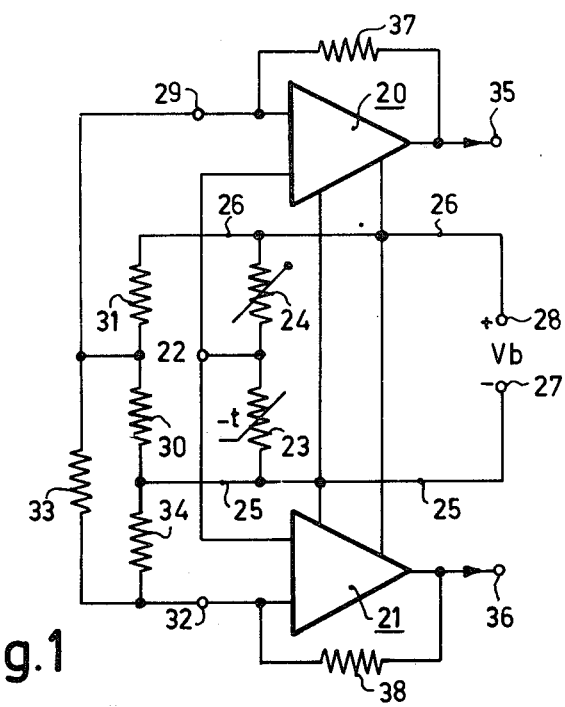
FIG. 1 is a circuit diagram of a temperature transducer according to the invention, adapted to supply two threshold voltages.

In FIG. 1 the two interconnected first inputs of the two differential amplifiers 20 and 21 are connected to a common connection 22 of an NTC resistor 23 and a variable resistor 24, whose ends are connected to the supply lines 25 and 26 of the power supply for the transducer and the differential amplifiers 20 and 21.

The supply lines 25 and 26 are connected to the negative terminal 27 and the positive terminal 28 of a voltage source Vb.

A second input 29 of the differential amplifier 20 is connected to a common connection of the two resistors 30 and 31, which are included between the supply lines 25 and 26. A second input 32 of the differential amplifier 21 is connected to said common connection via a resistor 33, and also to the supply line 25 via a resistor 34.

The outputs of the differential amplifiers 20 and 21 are connected to the terminals 35 and 36, respectively and are further coupled to the second inputs via two feedback resistors 37 and 38.

The operation of the circuit arrangement of FIG. 1 may be explained as follows: when the voltage of the supply line 25 is taken as a fixed reference potential, the voltage at the input terminal 32 of the amplifier 21 is lower than that at the input terminal 29 of the amplifier 20, owing to the presence of the voltage divider formed by the resistors 33 and 34.

When the temperature of the resistor 23 is higher than the upper of the two threshold temperatures, the voltage at the terminal 22 is lower than those at the terminals 29 and 32, the amplifiers 20 and 21 are blocked and the outputs 35 and 36 are then at such a level that none of the devices connected to the outputs of the amplifiers is switched on.

When the temperature decreases, the voltage at the terminal 22 reaches the value of the voltage at the terminal 32 and energizes the amplifier 21. This amplifier is rapidly saturated owing to the presence of the feedback resistor 38, whereupon the voltage level at the output terminal 36 attains a value such that it releases the device connected to the output. When the temperature decreases further, the voltage at the terminal 22 becomes equal to that at the terminal 29, the amplifier 20 then is rapidly saturated owing to the feedback resistor 37, and the variation of the voltage at the terminal 35 releases the device which is connected to the output of the amplifier 20.

Thus, when the amplifiers 20 and 21 switch a device on or off at a specific level of the voltages at the terminals 35 and 36, the on/off operation controlled by the amplifier 21 can be shifted optionally with respect to that controlled by the amplifier 20 by influencing the ratio of the divider bridge formed by the resistors 33 and 34.

The voltage at the terminal 22 is adjusted with the aid of the resistor 24 so that it equals that at the terminal 29 when the NTC resistor 23 is at the lower threshold temperature, for example 18° C, after which by means of the ratio of the resistor bridge 33, 34 the voltage at the terminal 32 is fixed so that it equals that at the terminal 22 when the resistor 23 is at the upper threshold temperature, for example 20° C.

Figure 2:
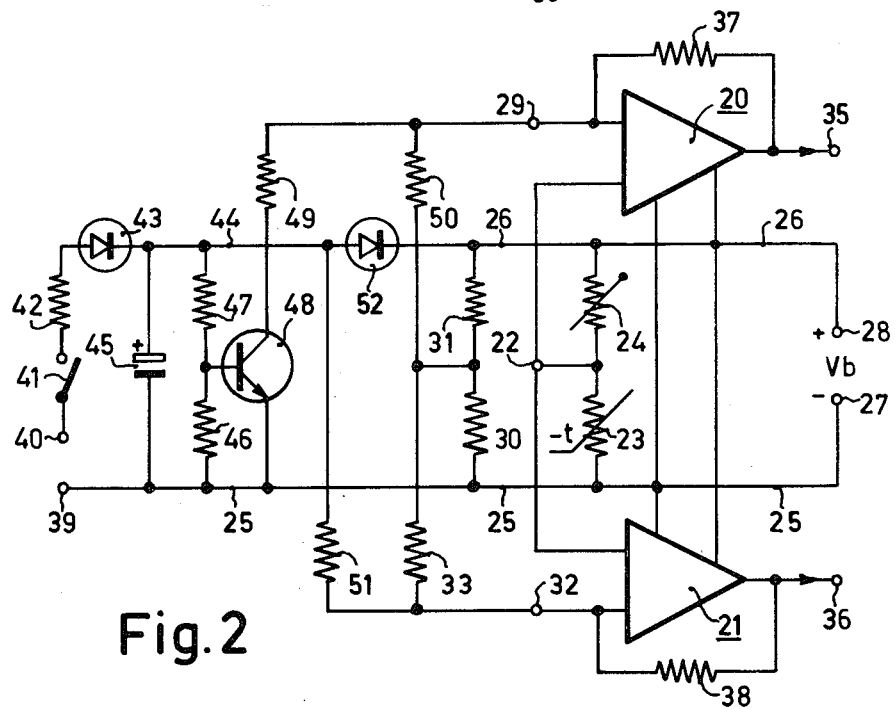
FIG. 2 shows the circuit diagram of the same transducer, to which a circuit is added which supplies other threshold voltages on the basis of information obtained from the tariff device.

In FIG. 2, in which corresponding elements bear the same reference numerals as FIG. 1, the supply line 25 is connected to an input terminal 39 of the neutral line of the supply mains, while another terminal 40 is connected to a phase line of this mains.

The terminal 40 is connected to the anode of a semiconductor diode 43 via a switch 41 and a resistor 42, the cathode of this diode being connected to a supply line 44 of the circuit.

Between the supply lines 44 and 25 an electrolytic smoothing capacitor 45 and a bridge comprising the resistors 46 and 47 are included. The base of an NPN type transistor 48 is connected to the common point of the resistors 46 and 47. The emitter of the transistor is directly connected to the supply line 25 and the collector to the terminal 29 via a resistor 49. Another resistor 50 is included between the terminal 29 and the common point of the resistors 30 and 31.

The terminal 32 is connected to the supply line 44 via a resistor 51, and this supply line is furthermore connected to the anode of a diode 52 whose cathode is connected to the supply line 26.

The circuit arrangement of FIG. 2 operates as follows: when the switch 41 is open, and the transistor 48 and the diode 52 are cut off, the circuit behaves in exactly the same way as that of FIG. 1, the resistor 34 of the lastmentioned circuit then being replaced by the series-connected resistors 46, 47 and 51.

When the switch 41 is closed, for example when the "night" tariff is effective, the mains voltage, which is rectified by the diode 43, charges the capacitor 45 until the diode 52 becomes conductive. At that instant the voltage between the lines 25 and 44 is stabilized at the value Vb + Vd, Vd being the voltage at the terminals of the diode 52 during direct conduction. This stabilized voltage, which is applied to the terminal 32, causes the potential at this terminal to increase while simultaneously the potential at the terminal 29 decreases owing to the transistor 48 being turned on. As a result, the changes of the output levels at the terminals 35 and 36 occur at different variations of the temperatures of the NTC resistor 23, so that two other threshold voltages can be obtained for actuating the devices connected to the outputs of the amplifiers 20 and 21.

Figure 3:
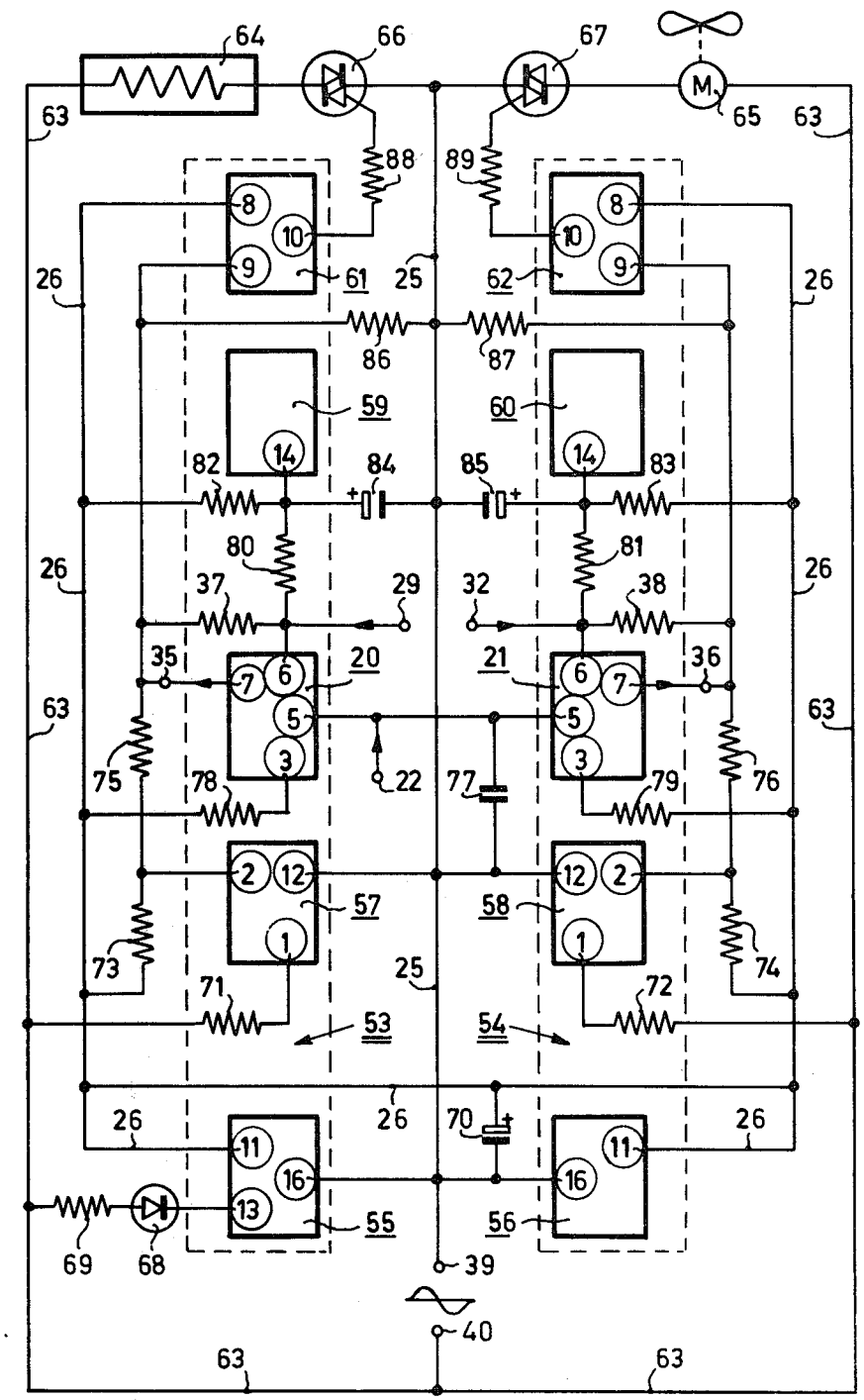
FIG. 3 shows the circuit diagram of an example of an application of the transducer according to the invention for controlling an accumulation heating system.

In FIG. 3 in which corresponding elements bear the same reference numerals as in FIGS. 1 and 2, the amplifiers 20 and 21 are incorporated in two monolithic integrated circuits 53 and 54 of the type TCA 280 A, shown inside the dashed frame. The circuits 53 and 54 furthermore comprise two voltage stabilizers 55 and 56, two zero-passage detectors 57 and 58, two sawtooth generators 59 and 60 and two amplifiers 61 and 62. The numbered input and output terminals of the integrated circuits 53 and 54 are represented by a circle in each of the blocks which correspond to the said functions.

The mains terminal 40 is connected to a supply line 63 of a heating resistor 64 and a fan-drive motor 65, which resistor and motor are connected to the neutral line 25 via the triacs 66 and 67 respectively.

The input 13 of the circuit 53 is connected to the cathode of a rectifier diode 68, whose anode is connected to the phase line 63 via a resistor 69.

The outputs 11 of the circuits 53 and 54 are connected to the supply line 26, which is isolated from the supply line 25 by an electrolytic capacitor 70, the outputs 16 and 12 of the said circuits being also connected to the line 25.

The outputs 1 and 2 are connected to the phase line 63 and the line 26 respectively via resistors 71, 72 and 73, 74 respectively.

The outputs 7 of the circuits 53 and 54, which constitute the output terminals 35 and 36 (FIGS. 1 and 2) of the differential amplifiers 20 and 21, are directly connected to the outputs 9 on the one hand, and to the outputs 2 via two resistors 75 and 76 on the other hand.

The interconnected inputs 5, which form the common input terminal 22 (FIGS. 1 and 2) are isolated from the line 25 by a capacitor 77, whereas the inputs 3 are connected to the supply line 26 via two resistors 78 and 79.

The inputs 6, which form the terminals 29 and 32 (FIGS. 1 and 2), are on the one hand connected to the outputs 7 via feedback resistors 37 and 38, and on the other hand to the outputs 14 via the resistors 80 and 81.

Further, the outputs 14 are connected to the supply line 26 via two resistors 82 and 83 and are coupled to the supply line 25 via two electrolytic capacitors 84 and 85. The outputs 7 and 9 are also connected to said line 25 via two resistors 86 and 87.

The outputs 8 are directly connected to the supply line 26, whereas the outputs 10 are connected to the control electrodes of the triacs 66 and 67 via two resistors 88 and 89.

The circuit arrangement of FIG. 3 operates as follows: the circuit 53 controls the power supply to the resistor 64 which is embedded in a fire-brick block, while the circuit 54 controls the power supply to the fan 65, which in turn controls the supply of hot air from the heat accumulator to the room to be heated.

At night the threshold temperatures are changed by the closure of the switch 41 (FIG. 2) which is included near the watt-hour meter.

The threshold temperatures may, for example, be as follows:

1. During the day: the fan is energized only if the temperature of the room is below 20° C. The resistor and the fan are energized when the room temperature is below 19° C.

2. At night: the resistor is energized only if the room temperature is below 20° C. The resistor and the fan are energized if the room temperature is below 18° C.

The two circuits 53 and 54 are connected as a variable thermostat in known manner, their operating threshold being shifted in accordance with "day" and "night" operation by changing the voltages applied to the terminals 29 and 32 (FIG. 2) in accordance with the process described hereinbefore.

The time constants of the sawtooth generators 59 and 60 are respectively adjusted to 30 and 2 seconds by means of the RC circuits 82, 84 and 83, 85.

Owing to the inductive nature of the load constituted by the fan motor 65, it may be useful to couple the terminal 1 of the zero passage detector 58, in a manner not shown, to the phase line 63 via a phase shifter, instead of via the resistor 72, in order to ensure that the triac 67 is cut off when the current in said motor is minimal.

The supply of power to the integrated circuits 53 and 54 of the transducer and to the "day"/"night" switching circuit from a direct voltage source via the voltage stabilizer 55 eliminates any possibility of fluctuation of the threshold voltages, so that even slight deviations, as in the case of separate power supplies, cannot occur.

Although in the embodiment described there are three threshold temperatures, because that of 20° C is common for two modes of operation, it is obvious that the control device according to the invention may be adapted to respond to four different temperatures.

What is claimed is:

1. A temperature transducer arrangement which supplies threshold voltages by means of a single sensor comprising, a first resistor bridge including one sensor resistor having a high temperature coefficient, a voltage source, at least two high gain differential amplifiers arranged to provide on/off control of a mains-powered electrical load, means connecting two interconnected first inputs of the differential amplifiers to a common junction point of the first resistor bridge, means connecting the first resistor bridge to the terminals of the voltage source, means connecting the second inputs of the two differential amplifiers to a second resistor bridge, one directly and the other via a voltage divider, and means connecting the second resistor bridge between the terminals of the voltage source.

2. A transducer arrangement as claimed in claim 1, characterized in that the second input of a first one of said differential amplifiers is connected to one of the terminals of a second voltage source, and means connecting the other terminal of the second voltage source in common with one of the terminals of the first voltage source.

3. A transducer arrangement as claimed in claim 2 further comprising a first resistor, means connecting the second input of a second one of said differential amplifiers to a main electrode of a transistor via said first resistor, means connecting the other main electrode of the said two transistor to the common terminal of the said two voltage sources, means connecting the control electrode of said transistor to a third resistor bridge, and means connecting said third resistor bridge to the terminals of the second voltage source.

4. A control arrangement for supplying at least two threshold control voltages by means of a single sensor element comprising, a source of voltage having a pair of output terminals, a first resistor bridge connected across said output terminals and comprising a first resistor in series with a second resistor sensor element of the type that exhibits a variation in resistance in response to an external physical parameter, first and second high gain differential amplifiers each having first and second input terminals and an output terminal for deriving an output signal having first and second defined trigger voltage levels which provides on/off control of a mains-powered electric load means, means directly interconnecting the first input terminals of the first and second differential amplifiers to the common junction point between said first and second resistors, a second resistor bridge comprising third and fourth resistors serially connected across the output terminals of the voltage source, a voltage divider comprising first and second series connected impedance elements connected across a part of said second resistor bridge, means directly connecting the second input terminal of the second differential amplifier to the second resistor bridge, and means connecting the second input terminal of the first differential amplifier to an intermediate junction point on said voltage divider whereby the voltage levels at the second input terminals of the first and second differential amplifiers are different and hence the trigger levels of said first and second differential amplifiers are different.

5. A control arrangement as claimed in claim 4 wherein the second input terminal of the second differential amplifier is directly connected to the common junction point between said third and fourth resistors.

6. A control arrangement as claimed in claim 4 wherein said voltage divider is connected in parallel with the fourth resistor.

7. A control arrangement as claimed in claim 4 wherein the second resistor comprises a resistor having a high temperature coefficient of resistance for sensing variations in the temperature of a given area.

8. A control arrangement as claimed in claim 7 further comprising first and second current control devices coupling said electric load means to an AC mains, and means connecting the control electrodes of said first and second current control devices to the output terminals of said first and second differential amplifiers, respectively.

9. A control arrangement as claimed in claim 4 further comprising a second source of voltage having a first terminal connected in common with one output terminal of the first voltage source and a second terminal, and switching means for selectively coupling the second terminal of the second voltage source to the second input terminal of the first differential amplifier, said switching means being operative to alter the voltage levels at the second input terminals of the first and second differential amplifiers and thereby to produce two further different trigger levels for said first and second differential amplifiers which are also different from the trigger levels produced when the second voltage source is disconnected by said switching means from the second input terminal of the first differential amplifier.

10. A control arrangement as claimed in claim 4 further comprising a second source of voltage having a first terminal connected in common with one output terminal of the first voltage source and a second terminal, switching means for selectively coupling the second terminal of the second voltage source to the second input terminal of the first differential amplifier, a transistor having one main electrode connected to the second input terminal of the first differential amplifier via a fifth resistor and a second main electrode connected to the common terminal of the first and second voltage sources, and means connecting the transistor control electrode to a tap on a third resistor bridge which bridge is connected across the terminals of the second voltage source.

11. A control arrangement as claimed in claim 9 wherein said physical parameter is temperature and said second resistor sensor element comprises a resistor having a high temperature coefficient, and wherein said means directly connecting the second input terminal of the second differential amplifier to the second resistor bridge directly connects said second input terminal to the common junction of said third and fourth resistors.

* * * * *